(12) United States Patent
Hars

(10) Patent No.: US 7,577,803 B2
(45) Date of Patent: Aug. 18, 2009

(54) NEAR INSTANTANEOUS BACKUP AND RESTORE OF DISC PARTITIONS

(75) Inventor: Laszlo Hars, Cranberry Township, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 428 days.

(21) Appl. No.: 11/707,388

(22) Filed: Feb. 16, 2007

(65) Prior Publication Data

US 2008/0201536 A1    Aug. 21, 2008

(51) Int. Cl.
*G06F 12/00* (2006.01)

(52) U.S. Cl. ............... 711/156; 711/4; 711/103; 711/112; 711/162; 711/170; 707/203; 707/204

(58) Field of Classification Search .......... 711/156, 711/4, 103, 112, 162, 170; 707/203, 204
See application file for complete search history.

(56) References Cited

U.S. PATENT DOCUMENTS

| | | | |
|---|---|---|---|
| 4,875,155 A | 10/1989 | Iskiyan et al. | |
| 5,148,540 A | 9/1992 | Beardsley et al. | |
| 5,247,692 A | 9/1993 | Fujimura | |
| 5,761,677 A | 6/1998 | Senator et al. | |
| 6,041,395 A | 3/2000 | Beelitz | |
| 6,047,294 A | 4/2000 | Deshayes et al. | |
| 6,055,546 A | 4/2000 | Pongracz et al. | |
| 6,167,494 A | 12/2000 | Cheston et al. | |
| 6,175,904 B1 | 1/2001 | Gunderson | |
| 6,295,577 B1 | 9/2001 | Anderson et al. | |
| 6,430,663 B1 | 8/2002 | Ding | |
| 6,513,097 B1 | 1/2003 | Beardsley et al. | |
| 6,718,466 B1 | 4/2004 | Duwe et al. | |
| 6,829,617 B2 | 12/2004 | Sawdon et al. | |
| 6,901,493 B1 | 5/2005 | Maffezzoni | |
| 6,915,397 B2 | 7/2005 | Lubbers et al. | |
| 7,343,514 B2 * | 3/2008 | Yamato et al. ............ 714/6 |
| 2003/0158862 A1 | 8/2003 | Eshel et al. | |
| 2003/0182547 A1 | 9/2003 | Kumagai | |
| 2004/0030846 A1 | 2/2004 | Armangau et al. | |
| 2004/0267822 A1 | 12/2004 | Curran et al. | |
| 2004/0268079 A1 | 12/2004 | Riedle et al. | |
| 2005/0081004 A1 | 4/2005 | Zhang | |
| 2005/0187992 A1 | 8/2005 | Prahlad et al. | |

* cited by examiner

*Primary Examiner*—Stephen C Elmore
(74) *Attorney, Agent, or Firm*—Robert P. Lenart, Esq.; Pietragallo Gordon Alfano Bosick & Raspanti, LLP

(57) ABSTRACT

An apparatus comprises a data storage medium including first and second partitions, wherein individual physical blocks in the first partition are paired with individual physical blocks in the second partition, a status flag for each of the pairs of physical blocks, and a controller for performing read and write operations on the physical blocks in accordance with the status flags. A method performed by the apparatus is also provided.

19 Claims, 1 Drawing Sheet

NEAR INSTANTANEOUS BACKUP AND RESTORE OF DISC PARTITIONS

FIELD OF THE INVENTION

This invention relates to data storage systems and, more particularly, to methods and apparatus for very fast backing up and restoring of content of the data storage systems.

BACKGROUND OF THE INVENTION

There are situations when the content of a data storage device needs to be restored to an earlier, known good state. Examples of such situations include: when the data on the storage device gets corrupted by a virus or a malicious or careless person, when a new device driver or other piece of software (SW) prevents the operating system (OS) from loading, or when important files are accidentally deleted or overwritten.

Backup methods for restoring storage device contents are known. However, such backup methods usually involve time-consuming copying of data.

There is a need for a method and apparatus for rapidly backing up and restoring the contents of data storage devices.

SUMMARY OF THE INVENTION

The invention provides an apparatus comprising a data storage medium including first and second partitions, wherein individual physical blocks in the first partition are paired with individual physical blocks in the second partition, a status flag for each of the pairs of physical blocks, and a controller for performing read and write operations on the physical blocks in accordance with the status flags.

In another aspect, the invention provides a method comprising: providing first and second sets of physical blocks in a storage medium, wherein individual physical blocks in the first set are paired with individual physical blocks in the second set, providing a status flag for each of the pairs of physical blocks, performing an operation on one of the physical blocks in accordance with the status flag, and changing the status flags in response to the operation performed.

The status flags can identify a status comprising one of: garbage, data, backup and live, wherein in response to a backup operation, a backup status changes to a garbage status and a live status changes to a data status, and in response to a restore operation, a backup status changes to a data status and a live status changes to a garbage status.

In another aspect, read operations can only be performed on physical blocks having a data or live status, and write operations can only be performed on the physical blocks having a garbage or live status.

The status flags can be stored in non-volatile memory, or in volatile memory and written to the storage medium using rotational energy in the event of a power failure.

DETAILED DESCRIPTION OF THE INVENTION

Figure 1:
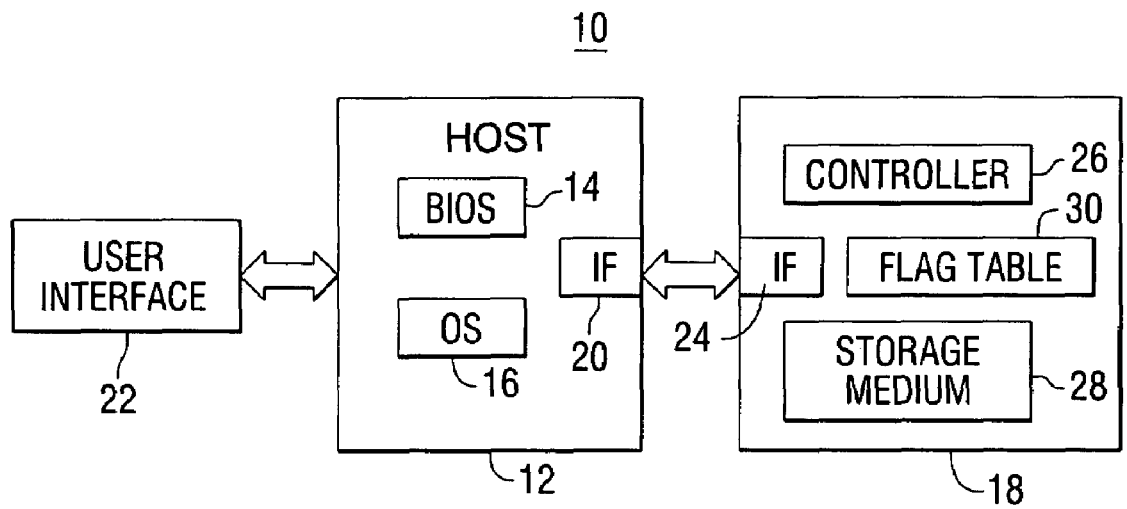
FIG. 1 is a schematic diagram computer system that can be constructed in accordance with one embodiment of the invention.

FIG. 1 is a schematic diagram of a computer system 10 that can be constructed in accordance with one embodiment of the invention. The system includes a host computer 12 that includes a basic input/output system (BIOS) 14 and an operating system (OS) 16. A data storage device 18, such as a disc drive, communicates with the host through an interface 20. The data storage device can be mounted internally within the host or located remotely from the host. A user interface 22 is included to provide user access to the host. The data storage device includes an interface 24, a controller 26, and a storage medium 28, which may include one or more data storage discs. A flag table 30 is also provided. Flags in the flag table are used to indicate the status of data in physical locations on the storage medium. The flag table can be stored in a non-volatile memory, which can be, for example, a hidden partition on the storage medium or a separate memory, such as a flash memory. The storage medium is divided into at least two partitions. In one embodiment of the invention, the two physical partitions form a virtual partition, which is visible as one single partition. In operation, data is written to, and read from the data storage medium in accordance with the flags.

This invention provides a method and apparatus that allows a user to create a snapshot of the state of one or more designated partitions (e.g., protected partitions) of the data storage device, and at a later time, to restore the data on the selected partition to the state existing when the last snapshot was taken. This can be accomplished by creating a "shadow" (e.g., invisible) partition for each protected partition when the disc is set up, and maintaining logical block addresses (LBA's), with pointers (also called status flags) that identify a status or attribute of a changed version and a backup version of the data located in the physical locations identified by the LBA's. The system can be implemented with only changes in the firmware, which performs low-level control of the disc drive, but better performance can be achieved through some additional hardware (HW) in the form of non-volatile memory.

In systems constructed in accordance with one embodiment of the invention, one logical disc block (addressed by one LBA) is represented by two physical disc blocks. These physical blocks are called live and shadow blocks. A user can enter a command that causes the system to take a snapshot of the data stored in the protected partition of the data storage device. When a snapshot is taken, the live physical blocks are marked as backup (by setting the appropriate flags), the old backup physical blocks are marked as containing no valid data. If the live physical block was never written with valid data, then no action is required, and the physical block previously designated as a backup remains a valid backup. Marking is implemented using a plurality of status flags that identify the status of data in the physical blocks.

When a restore operation is performed, the backup data is used to restore the data storage system to a known good state. Then the backup blocks are marked as containing valid data, and the live blocks are marked as containing invalid data (also called garbage).

Subsequent read operations access the block with valid data. Write operations, on the other hand, overwrite the garbage. In this case, the new data becomes the live data and its pair, the block with the previous valid data, becomes the backup.

In this manner, no data is manipulated during backup and restore operations. More specifically, no data is copied during backup and restore operations. Only the status flags are changed. In addition, only one physical block is accessed at any read or write operation (with possibly one flag update at the first write operation). Therefore the backup and restore operations are near instantaneous, and the speed of the read and write operations are not changed.

To illustrate the operation of the invention, let R and S be partitions, which are allocated at the time of partitioning the disc. Two equal-sized physical block ranges are used to identify physical data storage locations in the partitions. R initially forms the Regular partition and S the Shadow or hidden partition. The shadow partition is the first to contain backup physical blocks. Each physical block in the R partition is associated with a physical block in the S partition. These associated physical blocks are identified by a single Logical Block Address (LBA). The host issues commands referring to LBA's, and the disc drive firmware directs the data transfer to/from one of the associated physical blocks.

A physical block can contain invalid data (also referred to as garbage (G)) or valid data (D). Alternatively, a physical block can contain backup data (B) or live data (L). As used in this description, the backup data is data that was created by a user-initiated snapshot on the visible partition, and the live data (L) is data that is first written, and then normally accessed, by the user. Invalid data is data that can be overwritten, like the contents of disc blocks which were never written, or old backup data contents of disc blocks, after a new backup is made. The valid data serves as both the backup and live data in the same time, until the first write operation is implemented after a backup.

There are four status flag combinations that can be used to identify the status of data in each pair of the physical blocks. These flag combinations are shown in Table 1. The flags identify the status of a pair of physical blocks. In each flag, the first letter corresponds to a physical block in the R partition, and the second letter corresponds to a physical block in the S partition.

TABLE 1

| Flag | R partition | S partition |
| --- | --- | --- |
| GD | garbage | data |
| DG | data | garbage |
| BL | backup | live |
| LB | live | backup |

These combinations can be coded by a 2-bit flag for each pair of physical blocks. The disc operations for each possible flag value are described below.

There are four basic disc operations of interest for this invention: Backup, Restore, Read and Write. The status of data in the physical blocks can change when these operations are performed. For each operation, and for each flag value, the change of status of the physical block data and the new flag value are described in the tables below.

In a backup operation, a snapshot is taken of data in the blocks having a backup status (B). Flags for the Backup operation are shown in Table 2.

TABLE 2

| Old flag | New flag |
| --- | --- |
| GD | GD |
| DG | DG |
| BL | GD |
| LB | DG |

When a Backup operation is performed, if one physical block of a physical block pair contains invalid data (for example, if valid data was never written to that block), no action is required. If a physical block pair contains backup and live data, the physical block with live data is marked as containing valid data (which becomes the backup block when its mate first receives live data), and the old backup data becomes garbage, which can be overwritten later with live data.

In a Restore operation, data in the physical blocks having a backup status is used to restore the data storage device to a known good state. Flags for the Restore operation are shown in Table 3.

TABLE 3

| Old flag | New flag |
| --- | --- |
| GD | GD |
| DG | DG |
| BL | DG |
| LB | GD |

When a restore operation is performed, if one of a physical block pair contains invalid data (valid data was never written to that block), no action is required. If a physical block pair contains backup and live data, the block with live data is marked as garbage, which can be overwritten later with new live data; and the old backup data becomes the new valid data (which represents "restore").

A Read operation reads data from a physical location identified by an LBA and the corresponding flags, and a Write operation writes data to a possibly different physical location identified by an LBA and the corresponding flags. In the commands for Read and Write operations the Host specifies an LBA and receives or sends a block of data. The flags are maintained by the disc drive, the Host does not know about them, and they don't appear in Host commands. The data is either read from or written to the physical disc location corresponding to the specified LBA and the values of the flags.

Flags for the Read operation are shown in Table 4.

TABLE 4

| Old flag | R partition | S partition | New flag |
| --- | --- | --- | --- |
| GD | — | data | GD |
| DG | data | — | DG |
| BL | — | data | BL |
| LB | data | — | LB |

The Read operation does not change the flags. The data is taken from one of the two partitions, which contains valid (D) or live (L) data.

Flags for the Write operation are shown in Table 5.

TABLE 5

| Old flag | R partition | S partition | New flag |
| --- | --- | --- | --- |
| GD | data | — | LB |
| DG | — | data | BL |
| BL | — | data | BL |
| LB | data | — | LB |

The Write operation changes the G and D flags. The data is written to the partition which contains garbage (G) or live (L) data. If garbage is overwritten, it becomes live data (L) and its pair block (which is then marked as valid data) becomes the backup.

Figure 2:
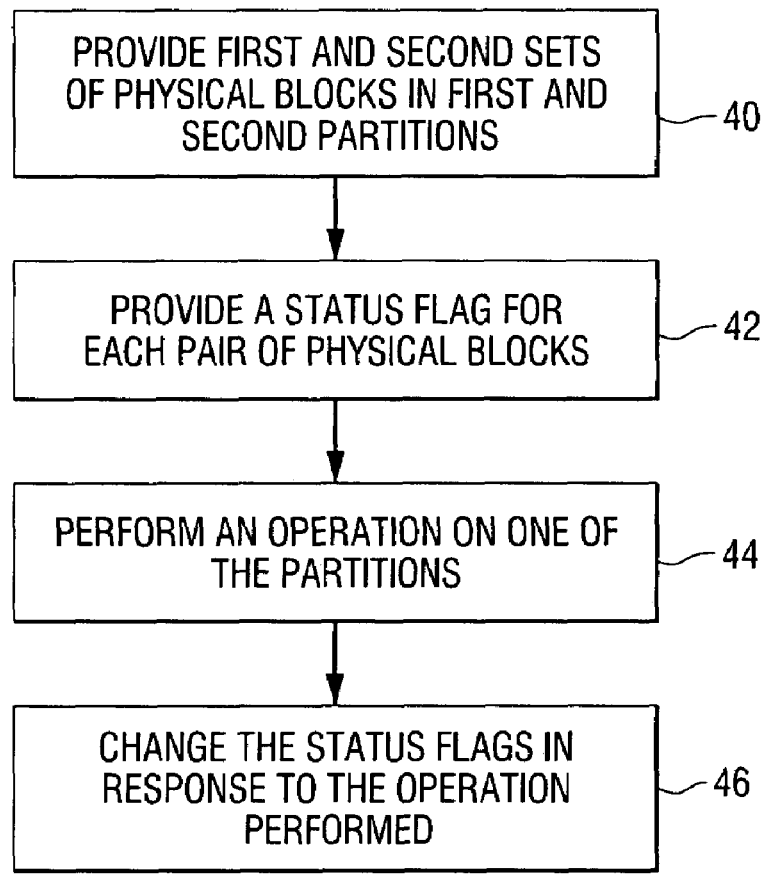
FIG. 2 is a flow diagram that illustrates the method of the invention.

FIG. 2 is a flow diagram that illustrates the operation of one embodiment of the invention. Block 40 shows that two equal-sized physical block ranges are established. Each range of blocks identifies physical locations in a partition in a storage medium. Individual blocks in one range are paired with individual blocks in the other range.

A status or attribute is assigned to each pair of physical blocks, as shown in block 42. One of several operations is performed on at least one of the physical blocks, as shown in block 44. In response to the operation, the status or attribute for a pair of physical blocks is updated (block 46). In this manner, a backup version of the data is maintained, and the backup version can be used to restore the data stored in the storage device to a previously backed up state, that is a known good state.

There are many ways to implement this scheme. Conceptually a simple way is to store the flags in non-volatile random access memory (RAM). In one embodiment, one physical block contains 0.5 KB of data.

Consider a 100 GB partition, with another 100 GB shadow partition. One only needs to know the beginning of these two partitions and the flags, to be able to find the physical blocks that have to be accessed for data read, write, backup and restore purposes. In this example, the beginnings of the partitions are used as offsets to locate the blocks that will be accessed.

In the case of 512 byte disc blocks, the RAM required for the flags is 0.5K·8/2=2K times smaller than the data area. In this example 100 GB/2K=50 MB memory is needed for the flags. This corresponds to 200 GB of disc space in the regular and shadow partitions. The RAM can be economically implemented in FLASH technology. Since disc Read and Write operations are not performed faster than 1 ms, there are no high speed requirements for the memory containing the flags.

In the case of object storage device (OSD) drives, additional cost savings can be realized because they already use large non-volatile RAM. In practice a more realistic scenario would be a 20 GB shadowed partition for the installed software (SW) and operating system (OS), because those need instantaneous backup and restore. The shadowed partition has a high cost in terms of storage area, i.e. the space for a same size hidden partition, which cannot be directly accessed by the Host. In this example, a 100 GB shadow space would allow five different users of the same machine to have their 20 GB software (SW) partitions shadowed.

Normally in the life of a drive, only a few thousand Backup and Restore operations are expected. After a Restore, only the first Write to a block would require a change of the flags. Therefore the 10,000 write cycle limit of inexpensive FLASH memory is more than enough.

Another option is using dynamic random access memory (DRAM) to store the flags. In a disc drive, if the power is lost, the content of this memory could be written to the disc using the residual energy of the rotating platters. At the next power-up, the saved RAM content would be restored.

In an alternative example, one can also use a technique similar to a hierarchical file system, with the flags stored on the storage medium. As a background activity, all live block data can be moved to the R partition, and the data in the paired blocks to the S partition. In addition, the set of blocks can be partitioned into sections, which form super-sections, possibly in more levels. Each section or super-section could be marked as being clean if all live data in it is moved to R; otherwise it could be marked as being dirty. Immediately after a Restore operation, data access becomes slower, because many blocks become dirty, and in this case the flags also need to be accessed from the disc. As the background task cleans the blocks in the sections, only the top-level (clean/dirty) flag (disc backed RAM) needs to be checked, and the Read/Write operations always work in the R partition only.

Sub-sections customarily correspond to cylinders (or tracks), with their dirty flag consuming only one system bit in the same cylinder. In one example, there are about 200 blocks in a cylinder, which reduces the non-volatile (or rotation energy backed up) RAM requirements to a few KB.

Further optimizations (still using the hierarchical file system idea) could allocate the R and S blocks in an alternating manner, next to each other (or on alternating cylinders) with their DG flags.

The Backup and Restore operations should occur during a boot sequence before the OS loads (i.e., under basic input/output system (BIOS) control, or in a pre-boot software environment), otherwise the system could crash. In this way, a corrupted OS could be fixed (i.e., restored) even if the computer does not boot. Furthermore, access control (e.g., password based) can be provided to request the snapshot/restore operations. Since these passwords could be discovered if the OS gets infected by malware, the password function should be disabled by the BIOS (e.g., using a freeze lock) after the OS starts.

Several extensions to the concept are possible. For example, one could allocate more than one shadow partition to a live partition, allowing full protection of all of them and instantaneous restore of different versions of software (SW) sets, or the OS. The invention can be useful for software (SW) development, testing, benchmarking or working with viruses, worms or other malicious SW.

The backup physical blocks could be made available for read-only access to the OS, without compromising the security. This can be done by a special Backup-Read Host command, by which data is read from the backup blocks, independent of the existence of live data blocks. This is useful to allow performing an external backup of the backup partition, or accessing backup data, without a full restore, when live data has been written to the disk.

While the invention has been described in terms of several embodiments, it will be apparent to those skilled in the art that various changes can be made to the described embodiments without departing from the scope of the invention as set forth in the following claims.

What is claimed is:

1. An apparatus comprising:
   a data storage medium including first and second partitions, wherein individual physical blocks in the first partition are paired with individual physical blocks in the second partition;
   a status flag for each of the pairs of physical blocks; and
   a controller for performing read and write operations on the physical blocks in accordance with the status flags.

2. The apparatus of claim 1, wherein the status flags identify a status comprising one of: garbage, data, backup and live.

3. The apparatus of claim 2, wherein in response to a backup operation, a backup status changes to a garbage status and a live status changes to a data status.

4. The apparatus of claim 2, wherein in response to a restore operation, a backup status changes to a data status and a live status changes to a garbage status.

5. The apparatus of claim 2, wherein read operations can only be performed on physical blocks having a data or live status, and the status flags do not change for read operations.

6. The apparatus of claim 2, wherein write operations can only be performed on the physical blocks having a garbage or live status, and each write operation changes a garbage status to a live status and a data status to a backup status.

7. The apparatus of claim 1, further comprising:
   non-volatile memory for storing the status flags.

8. The apparatus of claim 1, further comprising:
   a plurality of logical block addresses, each of the logical block addresses corresponding to a pair of the physical block addresses.

9. The apparatus of claim 1, further comprising:
   a third partition having physical blocks paired with the physical blocks in the first partition.

10. A method comprising:
    providing first and second sets of physical blocks in a storage medium, wherein individual physical blocks in the first set are paired with individual physical blocks in the second set;

providing a status flag for each of the pairs of physical blocks;

performing an operation on one of the physical blocks in accordance with the status flag; and changing the status flags in response to the operation performed.

11. The method of claim 10, wherein the status flags identify a status comprising one of: garbage, data, backup and live.

12. The method of claim 11, wherein in response to a backup operation, a backup status changes to a garbage status and a live status changes to a data status.

13. The method of claim 11, wherein in response to a restore operation, a backup status changes to a data status and a live status changes to a garbage status.

14. The method of claim 11, wherein read operations can only be performed on the physical blocks having a data or live status.

15. The method of claim 11, wherein write operations can only be performed on the physical blocks having a garbage or live status, and each write operation changes a garbage status to a live status and a data status to a backup status.

16. The method of claim 10, wherein the first and second sets of physical blocks are allocated when partitioning a data storage medium for supporting fast backup and restore operations.

17. The method of claim 10, further comprising:
moving data in a background operation to create contiguous live and backup partitions, with a hierarchical system of sections, controlled by clean/dirty flags.

18. The method of claim 10, further comprising:
issuing a backup-read host command.

19. The method of claim 10, wherein backup and restore operations are performed during a boot sequence.

* * * * *